United States Patent
Liu et al.

(10) Patent No.: US 10,752,855 B2
(45) Date of Patent: Aug. 25, 2020

(54) METHOD FOR PREPARING BRIQUETTE BINDER USING LANDFILL LEACHATE AND METHOD FOR PRODUCING INDUSTRIAL BRIQUETTE USING BRIQUETTE BINDER

(71) Applicants: FuZhou University, Fujian (CN); Fujian BoYi Environmental Protection Technology Co., LTD., Fuzhou, Fujian (CN)

(72) Inventors: Minghua Liu, Fujian (CN); Mingliang Cai, Fujian (CN); Yifan Liu, Fujian (CN); Guifang Yang, Fujian (CN); Dengzhou Liu, Fujian (CN)

(73) Assignees: FuZhou University, Fujian (CN); Fujian BoYi Enviornmental Protection Technology Co., LTD., Fujian (CN)

( * ) Notice: Subject to any disclaimer, the term of this patent is extended or adjusted under 35 U.S.C. 154(b) by 24 days.

(21) Appl. No.: 16/310,448

(22) PCT Filed: Jan. 23, 2018

(86) PCT No.: PCT/CN2018/073743
§ 371 (c)(1),
(2) Date: Dec. 17, 2018

(87) PCT Pub. No.: WO2018/137597
PCT Pub. Date: Aug. 2, 2018

(65) Prior Publication Data
US 2019/0322955 A1 Oct. 24, 2019

(30) Foreign Application Priority Data
Jan. 24, 2017 (CN) .......................... 2017 1 0062500

(51) Int. Cl.
*C10L 5/14* (2006.01)
*C10L 9/10* (2006.01)

(52) U.S. Cl.
CPC .................... *C10L 5/14* (2013.01); *C10L 9/10* (2013.01); *C10L 2200/0453* (2013.01); *C10L 2200/0461* (2013.01)

(58) Field of Classification Search
CPC ...... C10L 5/14; C10L 9/10; C10L 2200/0453; C10L 2200/0461
See application file for complete search history.

(56) References Cited

U.S. PATENT DOCUMENTS

| 4,615,712 A | 10/1986 | Wen | |
| 2015/0135785 A1* | 5/2015 | Wang | B09B 3/00 71/9 |
| 2015/0158063 A1* | 6/2015 | Moudilou | C04B 28/065 405/128.5 |

FOREIGN PATENT DOCUMENTS

| CN | 102051245 | 5/2011 |
| CN | 102311830 | 1/2012 |
| CN | 104774667 | 7/2015 |
| CN | 105349208 | 2/2016 |
| CN | 105418079 | 3/2016 |
| CN | 105950245 | 9/2016 |
| CN | 106701236 | 5/2017 |
| CN | 106755984 | * 10/2018 |
| EP | 0337579 | 10/1989 |
| KR | 20050083131 | * 8/2005 |

OTHER PUBLICATIONS

"International Search Report (Form PCT/ISA/210)", dated Apr. 8, 2018, with English translation thereof, pp. 1-4.
"Office Action of Germany Counterpart Application" with English translation thereof, dated Mar. 24, 2020, p. 1-p. 9.

* cited by examiner

*Primary Examiner* — Cephia D Toomer
(74) *Attorney, Agent, or Firm* — JCIPRNET

(57) ABSTRACT

A method for preparing a briquette binder using a landfill leachate and a method for producing an industrial briquette using the briquette binder. The landfill leachate is modified by sulfonation and amination, and is mixed with the modified rice straws to prepare the briquette binder, so as to effectively use the products generated in garbage processing to realize secondary economic benefits in garbage processing. The industrial briquette is produced by the prepared briquette binder, and the industrial briquette is used as steam coal or metallurgical coal with large briquette consumption, so as to promote the resource utilization of the landfill leachate, reduce the cost in preparation of the briquette binder and enhance benefits.

13 Claims, No Drawings

METHOD FOR PREPARING BRIQUETTE BINDER USING LANDFILL LEACHATE AND METHOD FOR PRODUCING INDUSTRIAL BRIQUETTE USING BRIQUETTE BINDER

CROSS-REFERENCE TO RELATED APPLICATION

This application is a 371 application of International PCT application serial no. PCT/CN2018/073743, filed on Jan. 23, 2018, which claims the priority benefit of Chinese application no. 201710062500.1, filed on Jan. 24, 2017. The entirety of each of the abovementioned patent applications is hereby incorporated by reference herein and made a part of this specification.

BACKGROUND

Technical Field

The present invention relates to the field of preparation of briquettes, and particularly to a method for preparing briquette binder using landfill leachate and a method for producing industrial briquette using briquette binder.

Description of Related Art

With the rapid development of Chinese economy, the energy gap is gradually expanding. Chinese energy consumption has exceeded one-fifth of the world's total amount and has exceeded the United States and has become the world's largest energy consumption country. However, the energy pattern of "less oil, less gas and more coal" and relatively low level of industrial equipment of China determine the main role of coal in the energy consumption structure of China. In addition, with the rapid development of China's social economy and the acceleration of urbanization, the amount of urban garbage in China has been increasing very rapidly. However, in processing a lot of municipal solid waste, a lot of garbage is piled up or buried in the open air, which not only occupies a lot of land, but also is easy to cause great secondary pollution to soil, groundwater and atmosphere, resulting in a serious environmental problem.

The waste will produce rich humic acid during aerobic fermentation, while the humic acid is an amorphous organic polymer, and its alkali solution is a hydrophilic reversible colloid. The hydrophilic reversible colloid has a large surface area and has the adhesive property of colloid and strong adsorption force, and can be used as the briquette binder. Therefore, it is of great importance to rationally develop and utilize the products in the process of waste disposal to improve the energy utilization environment and human ecological environment of China and increase the high grade utilization of energy.

SUMMARY

To solve the problems in the prior art, the present invention provides a method for preparing a briquette binder using landfill leachate and a method for producing industrial briquette using the briquette binder having the advantages of simple operation and convenient control of processing.

To achieve the above technical purpose, the technical solution of the present invention is: A method for preparing a briquette binder using landfill leachate includes the following steps:

a) adding landfill leachate concentrate with a solid content of 30%-40% to a reactor for stirring; after raising the solution temperature in the reactor to 80° C.-120° C., adding a sulfonating agent according to a mass ratio of the landfill leachate concentrate to the sulfonating agent of 10:1-1.5 to react for 2-3h; after the reaction is completed, controlling the temperature of the solution in the reactor as 30° C.-50° C.; adding an amination reagent according to a mass ratio of the landfill leachate concentrate to the amination reagent of 10:0.5-0.9; and after the reaction is completed, standing and cooling the solution to room temperature, to prepare modified landfill leachate; and b) uniformly mixing the above modified landfill leachate and modified rice straws, and heating and drying under continuous stirring, to prepare a required brown yellow powdery briquette binder.

Further, the sulfonating agent in the step a) is one or a mixture of more of sodium sulfite, sodium bisulfate, chlorosulfonic acid, sulfur trioxide and sulfamic acid.

Further, the amination reagent in the step a) is one or a mixture of more of ammonium hydroxide, ammonium hydrogen carbonate, urea and triethylamine.

Further, in the step b), a modifying method of the modified rice straws includes: breaking and screening air-dried rice straws, and selecting part of the rice straws below 3 mm and adding to a sodium hydroxide solution with a mass fraction of 0.5%-1.5% for stirring and uniformly mixing; and then heating and drying the mixed solution under 60° C.-70° C., to prepare the required modified rice straws.

Further, in the step b), the modified landfill leachate and the modified rice straws are uniformly mixed in accordance with a mass ratio of 1-2:1.

A method for producing industrial briquette using the above briquette binder includes: uniformly mixing the briquette binder, coal powder, petroleum coke, a sulphur-fixing agent and water in proportion and then extruding to produce the industrial briquette, wherein the industrial briquette includes the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

Further, in the raw material components, the particle diameter of the coal powder is less than 2 mm and the particle diameter of the petroleum coke is less than 5 mm.

Further, in the raw material components, the sulphur-fixing agent is one or a mixture of quick lime, limestone, magnesia and soda.

Further, the produced industrial briquette has a falling strength greater than or equal to 85%, a cold pressing strength greater than or equal to 560N, a waterproof time longer than or equal to 5 h and a calorific value greater than or equal to 5289 Kcal/kg.

An application of the above produced industrial briquette uses the above produced industrial briquette as steam coal or metallurgical coal.

By adopting the above technical solution, the present invention has the following beneficial effects: the landfill leachate is modified by sulfonation and amination, and is mixed with the modified rice straws to prepare the briquette binder, so as to effectively use the products generated in garbage processing to realize secondary economic benefits in garbage processing. The industrial briquette is produced by the prepared briquette binder, and the industrial briquette is used as steam coal or metallurgical coal with large briquette consumption, so as to promote the use amount of the landfill leachate, reduce the cost in preparation of the briquette binder and enhance benefits.

DESCRIPTION OF THE EMBODIMENTS

A method for preparing a briquette binder using landfill leachate includes the following steps:

a) adding landfill leachate concentrate with a solid content of 30%-40% to a reactor for stirring; after raising the solution temperature in the reactor to 80° C.-120° C., adding a sulfonating agent according to a mass ratio of the landfill leachate concentrate to the sulfonating agent of 10:1-1.5 to react for 2-3h; after the reaction is completed, controlling the temperature of the solution in the reactor as 30° C.-50° C.; adding an amination reagent according to a mass ratio of the landfill leachate concentrate to the animation reagent of 10:0.5-0.9; and after the reaction is completed, standing and cooling the solution to room temperature, to prepare modified landfill leachate; and b) uniformly mixing the above modified landfill leachate and modified rice straws, and heating and drying under continuous stirring, to prepare a required brown yellow powdery briquette binder.

Further, the sulfonating agent in the step a) is one or a mixture of more of sodium sulfite, sodium bisulfate, chlorosulfonic acid, sulfur trioxide and sulfamic acid.

Further, the amination reagent in the step a) is one or a mixture of more of ammonium hydroxide, ammonium hydrogen carbonate, urea and triethylamine.

Further, in the step b), a modifying method of the modified rice straws includes: breaking and screening air-dried rice straws, and selecting part of the rice straws below 3 mm and adding to a sodium hydroxide solution with a mass fraction of 0.5%-1.5% for stirring and uniformly mixing; and then heating and drying the mixed solution under 60° C.-70° C., to prepare the required modified rice straws.

Further, in the step b), the modified landfill leachate and the modified rice straws are uniformly mixed in accordance with a mass ratio of 1-2:1.

A method for producing industrial briquette using the above briquette binder includes: uniformly mixing the briquette binder, coal powder, petroleum coke, a sulphur-fixing agent and water in proportion and then extruding to produce the industrial briquette, wherein the industrial briquette includes the following raw material components in parts by weight:

| coal powder | 45-55 parts; |
| petroleum coke | 12-20 parts; |
| briquette binder | 11-18 parts; |
| sulphur-fixing agent | 4-9 parts; and |
| water | 8-10 parts. |

Further, in the raw material components, the particle diameter of the coal powder is less than 2 mm and the particle diameter of the petroleum coke is less than 5 mm.

Further, in the raw material components, the sulphur-fixing agent is one or a mixture of quick lime, limestone, magnesia and soda.

Further, the produced industrial briquette has a falling strength greater than or equal to 85%, a cold pressing strength greater than or equal to 560N, a waterproof time longer than or equal to 5 h and a calorific value greater than or equal to 5289 Kcal/kg.

An application of the above produced industrial briquette uses the above produced industrial briquette as steam coal or metallurgical coal.

Embodiment 1

Preparation of Briquette Binder step a) preparation of modified landfill leachate: adding 200 Kg of landfill leachate concentrate with a solid content of 30% to a reactor for stirring; after raising the solution temperature in the reactor to 80° C., adding 20 Kg of sodium sulfite to react for 2 h; after the reaction is completed, controlling the temperature of the solution in the reactor as 30° C.; adding 10 Kg of urea to react for 3.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1:1, and heating and drying under continuous stirring, to prepare a required brown yellow powdery briquette binder.

Preparation of industrial briquette selecting 55 parts of coal powder with a particle diameter less than 2 mm, 15 parts of petroleum coke with a particle diameter less than 5 mm, 16 parts of the above prepared powdery briquette binder, 4 parts of quick lime and 8 parts of water, fully stirring and uniformly mixing, and then extruding to prepare the required industrial briquette.

Embodiment 2

Preparation of Briquette Binder step a) preparation of modified landfill leachate: adding 200 Kg of landfill leachate concentrate with a solid content of 30% to a reactor for stirring; after raising the solution temperature in the reactor to 120° C., adding 30 Kg of sodium sulfite to react for 2 h; after the reaction is completed, controlling the temperature of the solution in the reactor as 30° C.; adding 10 Kg of urea to react for 4.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1:1, and heating and drying under continuous stirring, to prepare a required brown yellow powdery briquette binder.

Preparation of Industrial Briquette selecting 45 parts of coal powder with a particle diameter less than 2 mm, 20 parts of petroleum coke with a particle diameter less than 5 mm, 16 parts of the above prepared powdery briquette binder, 7 parts of quick lime and 10 parts of water, fully stirring and uniformly mixing, and then extruding to prepare the required industrial briquette.

Embodiment 3 step a) preparation of modified landfill leachate: adding 200 Kg of landfill leachate concentrate with a solid content of 30% to a reactor for stirring; after raising the solution temperature in the reactor to 100° C., adding 25 Kg of sodium sulfite to react for 2 h; after the reaction is completed, controlling the temperature of the solution in the reactor as 30° C.; adding 10 Kg of ammonium hydroxide to react for 4 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1:1, and heating and drying under continuous stirring, to prepare a required brown yellow powdery briquette binder.

Preparation of Industrial Briquette selecting 50 parts of coal powder with a particle diameter less than 2 mm, 18 parts of petroleum coke with a particle diameter less than 5 mm, 16 parts of the above prepared powdery briquette binder, 8 parts of quick lime and 9 parts of water, fully stirring and uniformly mixing, and then extruding to prepare the required industrial briquette.

Embodiment 4

Preparation of Briquette Binder step a) preparation of modified landfill leachate: adding 200 Kg of landfill leachate concentrate with a solid content of 40% to a reactor for stirring; after raising the solution temperature in the reactor to 80° C., adding 20 Kg of sodium sulfite to react for 2.5 h; after the reaction is completed, controlling the temperature of the solution in the reactor as 50° C.; adding 14 Kg of ammonium hydroxide to react for 3.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 1.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1.5:1, and heating and drying under continuous stirring, to prepare a required brown yellow powdery briquette binder.

Preparation of Industrial Briquette selecting 45 parts of coal powder with a particle diameter less than 2 mm, 20 parts of petroleum coke with a particle diameter less than 5 mm, 18 parts of the above prepared powdery briquette binder, 4 parts of limestone and 10 parts of water, fully stirring and uniformly mixing, and then extruding to prepare the required industrial briquette.

Embodiment 5

Preparation of Briquette Binder step a) preparation of modified landfill leachate: adding 200 Kg of landfill leachate concentrate with a solid content of 40% to a reactor for stirring; after raising the solution temperature in the reactor to 120° C., adding 30 Kg of sodium sulfite to react for 2.5 h; after the reaction is completed, controlling the temperature of the solution in the reactor as 50° C.; adding 14 Kg of ammonium hydrogen carbonate to react for 4.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 1.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1.5:1, and heating and drying under continuous stirring, to prepare a required brown yellow powdery briquette binder.

Preparation of Industrial Briquette selecting 50 parts of coal powder with a particle diameter less than 2 mm, 18 parts of petroleum coke with a particle diameter less than 5 mm, 18 parts of the above prepared powdery briquette binder, 7 parts of magnesia and 9 parts of water, fully stirring and uniformly mixing, and then extruding to prepare the required industrial briquette.

Embodiment 6

Preparation of Briquette Binder step a) preparation of modified landfill leachate: adding 200 Kg of landfill leachate concentrate with a solid content of 40% to a reactor for stirring; after raising the solution temperature in the reactor to 100° C., adding 25 Kg of sodium sulfite to react for 2.5 h; after the reaction is completed, controlling the temperature of the solution in the reactor as 50° C.; adding 14 Kg of ammonium hydrogen carbonate to react for 4 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 1.5% for stirring and uniformly mixing; and then heating and drying the mixed solution under 60° C., to prepare the required modified rice straws; and step c) preparation of a briquette binder: uniformly mixing the above modified landfill leachate and modified rice straws in accordance with a mass ratio of 1.5:1, and heating and drying under continuous stirring, to prepare a required brown yellow powdery briquette binder.

Preparation of Industrial Briquette selecting 55 parts of coal powder with a particle diameter less than 2 mm, 12 parts of petroleum coke with a particle diameter less than 5 mm, 18 parts of the above prepared powdery briquette binder, 9 parts of limestone and 8 parts of water, fully stirring and uniformly mixing, and then extruding to prepare the required industrial briquette.

Embodiment 7

Preparation of Briquette Binder step a) preparation of modified landfill leachate: adding 200 Kg of landfill leachate concentrate with a solid content of 30% to a reactor for stirring; after raising the solution temperature in the reactor to 80° C., adding 20 Kg of sulfamic acid to react for 3 h; after the reaction is completed, controlling the temperature of the solution in the reactor as 40° C.; adding 18 Kg of triethylamine to react for 3.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.8% for stirring and uniformly mixing; and then heating and drying the mixed solution under 70° C., to prepare the required modified rice straws; and step c) preparation of a briquette binder: uniformly mixing the above modified landfill leachate and modified rice straws in accordance with a mass ratio of 2:1, and heating and drying under continuous stirring, to prepare a required brown yellow powdery briquette binder.

Preparation of Industrial Briquette selecting 45 parts of coal powder with a particle diameter less than 2 mm, 20 parts of petroleum coke with a particle diameter less than 5 mm, 11 parts of the above prepared powdery briquette binder, 4 parts of soda and 10 parts of water, fully stirring and uniformly mixing, and then extruding to prepare the required industrial briquette.

Embodiment 8

Preparation of Briquette Binder step a) preparation of modified landfill leachate: adding 200 Kg of landfill leachate concentrate with a solid content of 35% to a reactor for stirring; after raising the solution temperature in the reactor to 120° C., adding 30 Kg of sulfamic acid to react for 3 h; after the reaction is completed, controlling the temperature of the solution in the reactor as 40° C.; adding 18 Kg of triethylamine to react for 4.5 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.8% for stirring and uniformly mixing; and then heating and drying the mixed solution under 70° C., to prepare the required modified rice straws; and step c) preparation of a briquette binder: uniformly mixing the above modified landfill leachate and modified rice straws in accordance with a mass ratio of 2:1, and heating and drying under continuous stirring, to prepare a required brown yellow powdery briquette binder.

Preparation of Industrial Briquette selecting 50 parts of coal powder with a particle diameter less than 2 mm, 18 parts of petroleum coke with a particle diameter less than 5 mm, 11 parts of the above prepared powdery briquette binder, 8 parts of soda and 9 parts of water, fully stirring and uniformly mixing, and then extruding to prepare the required industrial briquette.

Embodiment 9

Preparation of Briquette Binder step a) preparation of modified landfill leachate: adding 200 Kg of landfill leachate concentrate with a solid content of 35% to a reactor for stirring; after raising the solution temperature in the reactor to 100° C., adding 25 Kg of sulfamic acid to react for 3 h; after the reaction is completed, controlling the temperature of the solution in the reactor as 40° C.; adding 18 Kg of triethylamine to react for 4 h; and after the reaction is completed, standing and cooling the solution to room temperature, to prepare the modified landfill leachate;

step b) preparation of modified rice straws: breaking and screening air-dried rice straws, and selecting part of the rice straws below 3 mm and adding to a sodium hydroxide solution with a mass fraction of 0.8% for stirring and uniformly mixing; and then heating and drying the mixed solution under 65° C., to prepare the required modified rice straws; and step c) preparation of a briquette binder: uniformly mixing the above modified landfill leachate and modified rice straws in accordance with a mass ratio of 2:1, and heating and drying under continuous stirring, to prepare a required brown yellow powdery briquette binder.

Preparation of Industrial Briquette selecting 55 parts of coal powder with a particle diameter less than 2 mm, 12 parts of petroleum coke with a particle diameter less than 5 mm, 11 parts of the above prepared powdery briquette binder, 9 parts of soda and 8 parts of water, fully stirring and uniformly mixing, and then extruding to prepare the required industrial briquette.

Performance Test

The industrial briquettes produced in above embodiments 1-9 are subjected to cold pressure strength tests in accordance with a cold pressure strength test method for the industrial briquette specified in the coal industry recommended standard MT/T748-2007, subjected to waterproof performance tests in accordance with a waterproof performance test method for the industrial briquette specified in the coal industry recommended standard MT/T749-1997 and subjected to calorific value determination for the industrial briquette in accordance with the national recommended standard GB/T213-2008. Test results are shown in the following table:

| | Performance | | | |
| --- | --- | --- | --- | --- |
| Material | Falling Strength (%) | Cold Pressure Strength (N/piece) | Waterproof Time (h) | Calorific Value (Kcal/kg) |
| Embodiment 1 | 91 | 612 | 5.5 | 5402 |
| Embodiment 2 | 94 | 650 | 6.0 | 6107 |
| Embodiment 3 | 86 | 570 | 5.0 | 5702 |
| Embodiment 4 | 96 | 685 | 6.5 | 6223 |
| Embodiment 5 | 87 | 568 | 5.5 | 5630 |
| Embodiment 6 | 90 | 609 | 6.0 | 5289 |
| Embodiment 7 | 97 | 683 | 6.0 | 6453 |
| Embodiment 8 | 88 | 588 | 7.0 | 5591 |
| Embodiment 9 | 92 | 625 | 6.5 | 5396 |
| Minimum in Embodiments | ≥86% | 568 | 5.0 | 5289 |

It is known from the results shown in the above table that the industrial briquette prepared by using the briquette binder prepared by the present invention can satisfy forming technological requirements and the requirements of corresponding industrial use standards.

The above are embodiments of the present invention. For those ordinary skilled in the art, according to the instruction of the present invention, equivalent changes, amendments, replacements and variations made in accordance with the scope of the application patent of the present invention without departing from the principle and the spirit of the present invention shall belong to the scope of the present invention.

What is claimed is:

1. A method for preparing a briquette binder using a landfill leachate, comprising the following steps:
   a) adding a concentrate of landfill leachate with a solid content of 30%-40% to a reactor for stirring; after raising a solution temperature in the reactor to 80° C.-120° C., adding a sulfonating agent according to a mass ratio of the concentrate of the landfill leachate to the sulfonating agent of 10:1-1.5 to react for 2-3h; after the reaction is completed, controlling the solution temperature in the reactor as 30° C.-50° C.; adding an amination reagent according to a mass ratio of the concentrate of the landfill leachate to the amination reagent of 10:0.5-0.9; and after the reaction is completed, standing and cooling the solution to room temperature, to prepare a modified landfill leachate; and
   b) uniformly mixing the above modified landfill leachate and modified rice straws, and heating and drying under continuous stirring, to prepare a required brown yellow powdery briquette binder,
   wherein the modified rice straws are prepared by adding rice straws in a sodium hydroxide solution, mixing the mixed solution, and heating and drying the mixed solution.

2. The method for preparing the briquette binder using the landfill leachate according to claim 1, wherein the sulfonating agent in the step a) is sodium sulfite, sodium bisulfite, chlorosulfonic acid, sulfur trioxide, sulfamic acid, or a mixture thereof.

3. The method for preparing the briquette binder using the landfill leachate according to claim 1, wherein the amination reagent in the step a) is ammonium hydroxide, ammonium hydrogen carbonate, urea, triethylamine, or a mixture thereof.

4. The method for preparing the briquette binder using the landfill leachate according to claim 1, wherein a modifying method of the modified rice straws in the step b) comprises: breaking and screening air-dried rice straws, and selecting part of the rice straws below 3 mm and adding to a sodium hydroxide solution with a mass fraction of 0.5%-1.5% for stirring and uniformly mixing;
   and then heating and drying the mixed solution under 60° C.-70° C., to prepare the required modified rice straws.

5. The method for preparing the briquette binder using the landfill leachate according to claim 1, wherein the modified landfill leachate and the modified rice straws in the step b) are uniformly mixed in accordance with a mass ratio of 1-2:1.

6. A method for producing an industrial briquette using the briquette binder of claim 1, wherein uniformly mixing the briquette binder, a coal powder, a petroleum coke, a sulphur-fixing agent and water in proportion and then extruding to produce the industrial briquette, wherein the industrial briquette comprises the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

7. The method for producing industrial briquette using the briquette binder according to claim 6, wherein in the raw material components, the particle diameter of the coal powder is less than 2 mm and the particle diameter of the petroleum coke is less than 5 mm.

8. The method for producing industrial briquette using the briquette binder according to claim 6, wherein in the raw material components, the sulphur-fixing agent is one or a mixture of quick lime, limestone, magnesia and soda.

9. The method for producing industrial briquette using the briquette binder according to claim 6, wherein the produced industrial briquette has a falling strength greater than or equal to 85%, a cold pressing strength greater than or equal to 560N/piece, a waterproof time longer than or equal to 5h and a calorific value greater than or equal to 5289 Kcal/kg.

10. A method for producing an industrial briquette using the briquette binder of claim 2, wherein uniformly mixing the briquette binder, a coal powder, a petroleum coke, a sulphur-fixing agent and water in proportion and then extruding to produce the industrial briquette, wherein the industrial briquette comprises the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

11. A method for producing an industrial briquette using the briquette binder of claim 3, wherein uniformly mixing the briquette binder, a coal powder, a petroleum coke, a sulphur-fixing agent and water in proportion and then extruding to produce the industrial briquette, wherein the industrial briquette comprises the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

12. A method for producing an industrial briquette using the briquette binder of claim 4, wherein uniformly mixing the briquette binder, a coal powder, a petroleum coke, a sulphur-fixing agent and water in proportion and then extruding to produce the industrial briquette, wherein the industrial briquette comprises the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

13. A method for producing an industrial briquette using the briquette binder of claim 5, wherein uniformly mixing the briquette binder, a coal powder, a petroleum coke, a sulphur-fixing agent and water in proportion and then extruding to produce the industrial briquette, wherein the industrial briquette comprises the following raw material components in parts by weight:

| | |
|---|---|
| coal powder | 45-55 parts; |
| petroleum coke | 12-20 parts; |
| briquette binder | 11-18 parts; |
| sulphur-fixing agent | 4-9 parts; and |
| water | 8-10 parts. |

\* \* \* \* \*